ically US007767759B2 -->

(12) United States Patent
Kim

(10) Patent No.: US 7,767,759 B2
(45) Date of Patent: Aug. 3, 2010

(54) COMPOSITION FOR USE IN GOLF BALLS

(75) Inventor: Hyun Jin Kim, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 195 days.

(21) Appl. No.: 11/182,170

(22) Filed: Jul. 14, 2005

(65) Prior Publication Data

US 2006/0014898 A1 Jan. 19, 2006

Related U.S. Application Data

(60) Provisional application No. 60/588,603, filed on Jul. 16, 2004.

(51) Int. Cl.
C08L 33/02 (2006.01)
C08K 5/17 (2006.01)
A63B 37/00 (2006.01)

(52) U.S. Cl. ............... 525/183; 525/329.8; 525/329.9; 524/157; 524/217; 524/238; 524/240; 473/372; 473/378; 473/385

(58) Field of Classification Search ............... None
See application file for complete search history.

(56) References Cited

U.S. PATENT DOCUMENTS

| | | | |
|---|---|---|---|
| 3,264,272 A | | 8/1966 | Rees |
| 3,388,186 A | | 6/1968 | Kray et al. |
| 3,465,059 A | | 9/1969 | Seven et al. |
| 3,634,543 A | | 1/1972 | Sherrnan |
| 4,035,438 A | | 7/1977 | Nielinger et al. |
| 4,104,216 A | | 8/1978 | Clampitt |
| 4,217,430 A | * | 8/1980 | Starkweather et al. ...... 525/183 |
| 4,404,325 A | * | 9/1983 | Mason et al. ............... 525/179 |
| 4,884,814 A | | 12/1989 | Sullivan |
| 5,130,372 A | | 7/1992 | Lences et al. |
| 5,306,760 A | | 4/1994 | Sullivan |
| 5,312,857 A | | 5/1994 | Sullivan |
| 5,324,783 A | | 6/1994 | Sullivan |
| 5,688,869 A | * | 11/1997 | Sullivan ...................... 525/196 |
| 5,789,475 A | | 8/1998 | Chen |
| 5,886,103 A | * | 3/1999 | Bellinger et al. ............. 525/179 |
| 5,973,046 A | | 10/1999 | Chen et al. |
| 6,100,321 A | | 8/2000 | Chen |
| 6,329,458 B1 | | 12/2001 | Takesue et al. |
| 6,562,906 B2 | | 5/2003 | Chen |
| 6,616,552 B2 | | 9/2003 | Takesue et al. |
| 2003/0158312 A1 | | 8/2003 | Chen |
| 2004/0236030 A1 | | 11/2004 | Kim et al. |
| 2005/0288446 A1 | | 12/2005 | Zieske et al. |

FOREIGN PATENT DOCUMENTS

| EP | 342244 | * 11/1989 |
|---|---|---|
| JP | 59157122 | * 9/1984 |
| JP | 04001231 | * 1/1992 |

OTHER PUBLICATIONS

Hawley's Condensed Chemical Dictionary 13th Edition 2001; pp. 206,828.*

* cited by examiner

Primary Examiner—David Buttner
(74) Attorney, Agent, or Firm—Klarquist Sparkman, LLP

(57) ABSTRACT

The present invention relates to a blend composition, suitable for use in golf ball manufacture, which is the reaction product of (A) a polymer of ethylene and/or an alpha olefin and one or more $\alpha$, $\beta$-ethylenically unsaturated $C_3$-$C_{20}$ carboxylic acids, sulfonic acids or phosphoric acids; (B) a compound having both amine and carboxylic acid functionality or a derivative of these functional groups; and (C) a basic metal ion salt, which has the capacity to neutralize some or all of the acidic group present in blend components (A) and (B). When (A) is a polymer comprising one or more $\alpha$, $\beta$-ethylenically unsaturated $C_3$-$C_{20}$ carboxylic acids it comprises a high molecular weight component having a molecular weight from about 80,000 to about 500,000.

5 Claims, 1 Drawing Sheet

COMPOSITION FOR USE IN GOLF BALLS

CROSS-REFERENCE TO RELATED APPLICATIONS

Priority is claimed under 35 U.S.C. §119(e) to U.S. Provisional Patent Application No. 60/588,603, filed on Jul. 16, 2004, entitled "Composition for Use in Golf Balls and Sports Equipment," by Hyun Jin Kim, which application is incorporated by reference herein.

BACKGROUND OF THE INVENTION

1. Field of the Invention

The present invention relates to a composition suitable for sports equipment in general, and more particularly to a composition suitable for use in golf ball manufacture. In one embodiment, the novel composition of the present invention is used in the manufacture of a golf ball comprising a core, a cover layer and, optionally, one or more inner cover layers. In one preferred embodiment, a golf ball is disclosed in which the cover layer comprises the novel composition of the present invention. In another preferred embodiment, a golf ball is disclosed in which at least one intermediate layer comprises the novel composition of the present invention. In another preferred embodiment, a golf ball is disclosed in which the core comprises the novel composition of the present invention.

2. Description of Related Art

The application of synthetic polymer chemistry to the field of sports equipment has revolutionized the performance of athletes in many sports. One sport in which this is particularly true is golf, especially as relates to advances in golf ball performance and ease of manufacture. For instance, the earliest golf balls consisted of a leather cover filled with wet feathers. These "feathery" golf balls were subsequently replaced with a single piece golf ball made from "gutta percha," a naturally occurring rubber-like material. In the early 1900's, the wound rubber ball was introduced, consisting of a solid rubber core around which rubber thread was tightly wound with a gutta percha cover.

More modern golf balls can be classified as one-piece, two-piece, and three-piece (also known as "wound"). One-piece balls are molded from a homogeneous mass of material with a dimple pattern molded therein. One-piece balls are inexpensive and very durable, but do not provide great distance because of relatively high spin and low velocity. Two-piece balls are made by molding a cover around a solid core. These are the most popular types of balls in use today. Two-piece balls typically have a hard "cut proof" cover which gives a durable as well as a longer distance ball, but also a ball with lower spin rates, which result in a decreased ability to control the ball.

Three-piece or wound balls are made by molding a cover about a wound core. The core is typically made of rubber and can be solid, semi-solid or have a liquid center. A wound core is prepared by winding a thin thread of elastic material about the center core. The wound core is then covered with a durable cover material. Wound balls are generally softer and provide more spin, resulting in increased control over the ball, but such balls typically travel shorter distances than a two-piece ball. As a result of their more complex construction, wound balls generally require a longer time to manufacture and are more expensive to produce than two-piece balls.

Golf ball covers are sometimes made from balata rubber which is favored by some players because the softness of the cover allows them to achieve spin rates sufficient to allow more precisely control of ball direction and distance, particularly on shorter approach shots. However, balata-covered balls are expensive and less durable as compared to the other covering materials. In particular, balata covered balls are subject to nicks or cuts which can detract from the ball's flight characteristics. In addition, the balata-covered balls, although exhibiting high spin and soft feel, often are deficient in terms of the velocity of the ball when it leaves the club face which in turn affects the distance the ball travels. This distance is directly related to the coefficient of restitution ("C.O.R.") of the ball.

One way to measure the coefficient of restitution is to propel a ball at a given speed against a hard massive surface, and measure its incoming velocity and outgoing velocity. The coefficient of restitution is defined as the ratio of the outgoing velocity to incoming velocity of a rebounding ball and is expressed as a decimal. As a result, the coefficient of restitution can vary from zero to one, with one being equivalent to an elastic collision and zero being equivalent to an inelastic collision.

The coefficient of restitution of a one-piece golf ball is a function of the ball's composition. In a two-piece or a multi-layered golf ball, the coefficient of restitution is a function of the properties of the core, the cover and any additional layer. While there are no United States Golf Association ("USGA") limitations on the coefficient of restitution values of a golf ball, the USGA requires that the golf ball cannot exceed an initial velocity of 255 feet/second. As a result, golf ball manufacturers generally seek to maximize the coefficient of restitution of a ball without violating the velocity limitation.

Accordingly, a variety of golf ball constructions have been developed in an attempt to provide spin rates and a feel approaching those of balata covered balls, while also providing a golf ball with a higher durability and overall distance. This has resulted in the emergence of balls, which have a solid rubber core, a cover, and one, or more so called intermediate layers, as well as the application of new materials to each of these components.

A material which has been often utilized in recent golf balls is the family of ionomer resins developed in the mid-1960's, by E.I. DuPont de Nemours and Co., and sold under the trademark SURLYN®. These ionomer resins have, to a large extent, replaced balata as a golf ball cover stock material. Preparation of such ionomers is well known, for example see U.S. Pat. No. 3,264,272 (the entire contents of which are herein incorporated by reference). Generally speaking, commercial ionomers consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer."

The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it was also well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers are typically defined as those ionomer resins with acrylic or methacrylic acid units present from 16 wt. % to about 35 wt. % in the polymer. Generally, such a high acid ionomer will have a flexural modulus from about 50,000 psi to about 125,000 psi.

Ionomer resins can further comprise a softening comonomer, which is typically present from about 10 wt. % to about 50 wt. % in the polymer. Such ionomers will have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth)acrylic acid and (meth)acrylate, all of which many of which are be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y, where E is ethylene, X is a softening comonomer such as acrylate or methacrylate present in an amount of from 0 wt. % to about 50 wt. % of the polymer, and Y is acrylic or methacrylic acid present in an amount from about 5 wt. % to about 35 wt. % of the polymer, and wherein the acid moiety is neutralized from about 1% to about 90% to form an ionomer with a cation such as lithium, sodium, potassium, magnesium, calcium, barium, lead, tin, zinc or aluminum, or a combination of such cations.

More recent developments in the field have attempted to utilize the various types of high acid and/or highly neutralized ionomers, both singly and in blend compositions to optimize the often conflicting golf ball performance requirements of high C.O.R. and ball velocity, and cover durability, with the need for a ball to spin and have a so-called soft feel on shorter iron shots. However, the incorporation of more acid in the ionomer and/or increasing its degree of neutralization results in a material with increased polarity, and hence one which is often less compatible with other potential blend materials. Also increasing the acid content of the ionomer while increasing C.O.R. may render the ball too hard and brittle causing a loss of shot feel, control (i.e., the ability to spin the ball) and may render the cover too brittle and prone to premature failure. Finally, the incorporation of more acid in the ionomer and/or increasing its degree of neutralization typically results in an increase in melt viscosity which in turn greatly decreases the processability of these resins. Attempts to mediate these effects by adding softer terpolymeric ionomers to high acid ionomer compositions to adjust the hardness and improve the shot "feel" often result in concomitant loss of C.O.R. and hence distance.

In addition, various hard-soft ionomer blends, that is, mixtures of ionomer resins, which are significantly different in hardness and/or flexural modulus, have been attempted. For instance, U.S. Pat. No. 4,884,814 discloses the blending of various hard methacrylic based ionomer resins with similar or larger quantities of one or more "soft" ionomer methacrylic acid based ionomer resins (i.e., those ionomer resins having a hardness from about 25 to 40 as measured on the Shore D scale) to produce relatively low modulus golf ball cover compositions that are not only softer than the prior art hard ionomer covers but also exhibit a sufficient degree of durability for repetitive play. These relatively low modulus cover compositions were generally comprised of from about 25 to 70% of hard ionomer resins and from about 30 to 75% of soft ionomer resins.

Also, U.S. Pat. No. 5,324,783 discloses golf ball cover compositions comprising a blend of a relatively large amount, e.g., 70-90 wt. %, of hard ionomer resins with a relatively low amount, e.g., 10 to about 25-30 wt. %, of soft ionomers. The hard ionomers are sodium or zinc salts of a copolymer of an olefin having from 2 to 8 carbon atoms and an unsaturated monocarboxylic acid having from 3 to 8 carbon atoms. The soft ionomer is a sodium or a zinc salt of a terpolymer of an olefin having from 2 to 8 carbon atoms, methacrylic acid and an unsaturated monomer of the acrylate ester class having from 1 to 21 carbon atoms.

In order to further extend the range of properties of the ionomer resins to optimize golf ball performance, additional components have been added to them as "modifiers." For example, U.S. Pat. No. 4,104,216 (Clampitt) discloses ionomers modified with 5-50 weight percent of a long chain (un)saturated fatty acid.

Also, Japanese Patent Application No. 48/70757 discloses ionomers modified with a high level of a low molecular weight saturated or unsaturated carboxylic acid or salt or anhydride, specifically 10 to 500 parts per 100 parts by weight of ionomer. The carboxylic acid may have 1 to 100 hydrocarbon carbon chain units. Stearic, citric, oleic and glutamic acid and/or salts are exemplified.

U.S. Pat. Nos. 5,312,857 and 5,306,760 disclose cover compositions for golf ball construction comprising mixtures of ionomer resins and 25-100 parts by weight of various fatty acid salts (i.e., metal stearates, metal oleates, metal palmitates, metal pelargonates, metal laurates, etc.).

U.S. Pat. No. 6,100,321 and U.S. Patent Publication No. 2003/0158312 A1, disclose ionomer compositions, which are modified with 25 to 100 parts by weight of a fatty acid salt such as a metal stearate, for the production of golf balls with good resilience and high softness. Unlike the earlier mentioned patents, which have employed metal stearates as a filler material, these patents disclose the use of relatively low levels of a stearic acid moiety, especially calcium stearate, to modify ionomers to produce improved resilience for a given level of hardness or PGA Compression values. The stearate-modified ionomers are taught as being especially useful when the ionomer is formulated for use as a golf ball core, center, one-piece ball, or as a soft golf ball cover.

Subsequent patent applications have furthered the use of such modified ionomers in golf ball covers. For example U.S. Pat. No. 6,329,458 is directed to a golf ball cover comprising an ionomer resin and a metal "soap," e.g., calcium stearate. Finally, U.S. Pat. No. 6,616,552 discloses a golf ball including a multi-layer covet, one layer of which includes a heated mixture of an ionomer resin and a metal salt of a fatty acid, e.g., calcium stearate.

In addition to modifying ionomers by adding fatty acids and their metal salts, a number of patents have described modification of the unneutralized ethylene/carboxylic acid polymer, although not for use in golf balls. For instance U.S. Pat. Nos. 3,388,186 and 3,465,059 disclose compositions made by grafting amino acids or lactams onto a backbone chain containing recurring ethylenic units and reactive sites, such as carboxyl radicals of acid, ester or salt groups, and particularly acrylic acid esters.

U.S. Pat. No. 3,634,543 discloses nucleated graft polymers of polycaprolactam on carboxy-containing copolymeric backbones. The graft polymer is prepared by polymerization of caprolactam in the presence of a copolymer of an olefin and an unsaturated carboxylic acid.

U.S. Pat. No. 4,035,438 discloses an impact resistant mixture of polyethylene; a graft polymer of an ethylene/acrylic acid copolymer or ethylene/methacrylic acid copolymer as a graft substrate and grafted polymerized units of polycaprolactam.

Finally, U.S. Pat. No. 5,130,372 discloses an ionomer salt of low molecular weight reaction product of 1) a copolymer of an alpha-olefin and an unsaturated carboxylic acid; 2) at least one amino acid compound; and 3) a cation containing material. The unsaturated carboxylic acid is preferably an $\alpha,\beta$-ethylenically unsaturated carboxylic acid. The ionomer has excellent compatibility with other polymers, particularly polyamides. The ionomer was described as useful in a method to flush water from pigments.

However, there remains a need for new materials with equivalent or improved properties to the ionomer resins of the prior art for use in golf ball manufacture, but which but which are not plasticized in the sense of reduced modulus and stiffness. There also remains a need for new materials, which are more compatible with other resins, and which also do not give a hard feel to the golf ball or render it brittle and prone to failure and which do not require addition of softer terpolymeric ionomers which can cause a loss of C.O.R. It would also be highly advantageous if such new materials would exhibit increased C.O.R. and modulus, and still be easily processable by having a low melt viscosity.

SUMMARY OF THE INVENTION

The present invention is embodied in a blend composition including the reaction product of three Components, (A), (B) and (C). Component (A) is a polymer comprising ethylene and/or an alpha olefin; and one or more $\alpha,\beta$-ethylenically unsaturated $C_3$-$C_{20}$ carboxylic acids, sulfonic acids or phosphoric acids. Component (B) is a compound having a general formula $(R_2N)_m$—R'—$(X(O)_nOR_y)_m$, where R is either hydrogen, one or more $C_1$-$C_{20}$ aliphatic systems, one or more cycloaliphatic systems, one or more aromatic systems, or a combination of these. Also R' is a bridging group comprising one or more unsubstituted $C_1$-$C_{20}$ straight chain or branched aliphatic or alicyclic groups, or one or more substituted straight chain or branched aliphatic or alicyclic groups, or one or more aromatic groups, one or more oligomers each containing up to 12 repeating units, and when X is C or S or P, m is 1-3. Also when X=C, n=1 and y=1, and when X=S, n=2 and y=1, and when X=P, n=2 and y=2. Finally, Component (C) is a basic metal ion salt, which has the capacity to neutralize some, or all of the acidic group present in Blend Components (A) and (B).

More particularly, Component (A) is an ethylene/$\alpha,\beta$-ethylenically unsaturated $C_3$-$C_{20}$ carboxylic acid copolymer or an ethylene/$\alpha,\beta$-ethylenically unsaturated $C_3$-$C_{20}$ carboxylic acid/$\alpha,\beta$-ethylenically unsaturated $C_3$-$C_{20}$ carboxylic acid ester terpolymer. Component (B) is present in an amount from about 0.1 to about 40 phr; and Component (C) is a basic metal ion salt having a cation selected from the group consisting of, $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$.

Even more particularly, Component (A) is a unimodal ethylene/(meth)acrylic acid copolymer or ethylene/(meth)acrylic acid/(meth)acrylate terpolymer; or a bimodal polymer blend composition. The bimodal polymer blend includes a high molecular weight component having molecular weight of about 80,000 to about 500,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; which is partially neutralized with metal ions selected from the group consisting of lithium, sodium, zinc, calcium, magnesium, and combinations thereof. The bimodal polymer blend also includes a low molecular weight component having a molecular weight of about from about 2,000 to about 30,000 and comprising one or more ethylene/$\alpha$, $\beta$-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, magnesium, and combinations thereof. Also Component (B) is is present in an amount from about 1 to about 20 phr, and is selected from the group consisting of amino acids, polypeptides, carbamic acids, oxamic acids, anthranillic acids, and combinations thereof. Finally, Component (C) is a basic metal ion salt having a cation selected from the group consisting of, $Li^+$, $Na^+$, $K^+$, $Zn^{2+}$, and $Mg^{2+}$, and combinations thereof.

In a more detailed feature of the invention, Component (A) is a unimodal ethylene/(meth)acrylic acid copolymer or ethylene/(meth)acrylic acid/(meth)acrylate terpolymer. Also, Component (B) is present in an amount from about 1 to about 15 phr, and is either 4,4'-methylene-bis-(cyclohexylamine) carbamate), 11-aminoundecanoicacid, 12-aminododecanoic acid, epsilon-caprolactam; omega-caprolactam, or a combinations of these. Finally, Component (C), is either a metal formate, metal acetate, metal nitrate, metal carbonate, metal bicarbonate, metal oxide, metal hydroxide, metal alkoxides, or a combination of these.

In a further feature of the invention, the blend composition further includes an additional polymer selected from the group consisting of thermoplastic resins, thermoset resins, polyurethane resins, polyester resins, polyamide elastomer resins, polyamide-ionomer, polyurethane ionomer, thermoplastic copolyetherester block copolymer, thermoplastic copolyesterester block copolymer, thermoplastic elastomer, thermoset elastomer, synthetic rubber, thermoplastic vulcanizate, copolymeric ionomer, terpolymeric ionomer, polyurethane ionomer, polyamide ionomer, polycarbonate, polyolefin, polyamide, copolymeric polyamide, polyester, polyvinyl alcohol, acrylonitrile-butadiene-styrene copolymer, polyarylate, polyacrylate, polyphenylene ether, impact-modified polyphenylene ether, high impact polystyrene, diallyl phthalate polymer, metallocene catalyzed polymer, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, polysiloxane, and combinations thereof.

The present invention is also embodied in a blend composition including the reaction product of one or more ionomers and Component (B) which is a compound having a general formula $(R_2N)_m$—R'—$(X(O)_nOR_y)_m$, where R is either hydrogen, one or more $C_1$-$C_{20}$ aliphatic systems, one or more cycloaliphatic systems, one or more aromatic systems, or a combination of these. Also R' is a bridging group comprising one or more unsubstituted $C_1$-$C_{20}$ straight chain or branched aliphatic or alicyclic groups, or one or more substituted straight chain or branched aliphatic or alicyclic groups, or one or more aromatic groups, one or more oligomers each containing up to 12 repeating units, and when X is C or S or P, m is 1-3. Also when X=C, n=1 and y=1, and when X=S, n=2 and y=1, and when X=P, n=2 and y=2.

More particularly, the one or more ionomers is selected from either 1) a unimodal ionomer comprising an E/X/Y polymer, wherein E is ethylene, X is a $C_3$ to $C_8$ α,βethylenically unsaturated carboxylic acid, and Y is a softening comonomer selected from the group consisting of alkyl acrylate and alkyl methacrylate, wherein the alkyl groups have from 1-8 carbon atoms, wherein X is in the range of about 2 to about 30 weight % of the E/X/Y copolymer, and Y is in the range of 0 to about 35 weight % of the E/X/Y copolymer, and wherein the acid groups present in said ionomeric polymer are partially neutralized with a metal selected from the group consisting of zinc, sodium, lithium, calcium, magnesium, and combinations thereof; or (2) a bimodal ionomer which includes a high molecular weight component having a molecular weight in the range of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein said high molecular weight component is partially neutralized with metal ions selected from the group consisting of lithium, sodium, zinc, calcium, magnesium, and combinations thereof, and a low molecular weight component having a molecular weight in the range of about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein said low molecular weight component is partially neutralized with metal ions selected from the group consisting of lithium, sodium, zinc, calcium, magnesium, and combinations thereof; or (3) a modified unimodal ionomer including ethylene, from 5 to 25 weight percent (meth)acrylic acid (based on the total weight of said modified ionomeric polymer), from 0 to 40 weight percent of a $C_1$ to $C_8$-alkyl acrylate (based on the total weight of said modified ionomer), and from about 5 to about 40 weight percent (based on the total weight of said modified ionomer), of a fatty acid or one or more metal salts of a fatty acid; or (4) a modified bimodal ionomer including a high molecular weight component having a molecular weight in the range of about 80,000 to about 500,000 and comprising one or more ethylene/α,β-ethylenically unsaturated $C_{3-8}$ carboxylic acid copolymers and/or one or more ethylene, alkyl (meth)acrylate, (meth) acrylic acid terpolymers, wherein said high molecular weight component is partially neutralized with metal ions selected from the group consisting of lithium, sodium, zinc, calcium, magnesium, and combinations thereof, and a low molecular weight component having a molecular weight in the range of about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein said low molecular weight component is partially neutralized with metal ions selected from the group consisting of lithium, sodium, zinc, calcium, magnesium, and combinations thereof, and about 5 to about 40 weight percent (based on the total weight of said modified ionomeric polymer) of a fatty acid or one or more metal salts of a fatty acid; and combinations thereof. Also Component (B) is present in an amount from about 1 to about 20 phr and is selected from the group consisting of amino acids, polypeptides, carbamic acids, oxamic acids, anthranillic acids, and combinations thereof;

Even more particularly, the one or more ionomers is a unimodal ethylene/(methacrylic aid) copolymer or ethylene/methacrylic acid/(meth)acrylate ester terpolymer; and Component (B) is present in an amount from about 1 to about 15 phr, and is selected from the group consisting of 4,4'-methylene-bis-(cyclohexylamine)carbamate), 11-aminoundecanoicacid, 12-aminododecanoic acid, epsilon-caprolactam; omega-caprolactam, and combinations thereof.

In a further feature of the invention, this blend composition further includes an additional polymer selected from the group consisting of thermoplastic resins, thermoset resins, polyurethane resins, polyester resins, polyamide elastomer resins, polyamide-ionomer, polyurethane ionomer, thermoplastic copolyetherester block copolymer, thermoplastic copolyesterester block copolymer, thermoplastic elastomer, thermoset elastomer, synthetic rubber, thermoplastic vulcanizate, copolymeric ionomer, terpolymeric ionomer, polyurethane ionomer, polyamide ionomer, polycarbonate, polyolefin, polyamide, copolymeric polyamide, polyester, polyvinyl alcohol, acrylonitrile-butadiene-styrene copolymer, polyarylate, polyacrylate, polyphenylene ether, impact-modified polyphenylene ether, high impact polystyrene, diallyl phthalate polymer, metallocene catalyzed polymer, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, polysiloxane, and combinations thereof.

The present invention is also embodied in a golf ball including a core; and an outer cover layer; and from 0 to 5 intermediate layers; where one or more of said core, outer cover, and/or intermediate layers if present, includes a blend composition including the reaction product of three Components, (A), (B) and (C). Component (A) is a polymer including ethylene and/or an alpha olefin; and one or more α,β-ethylenically unsaturated $C_3$-$C_{20}$ carboxylic acids, sulfonic acids or phosphoric acids. Component (B) is a compound having a general formula $(R_2N)_m—R'—(X(O)_nOR_y)_m$, where R is either hydrogen, one or more $C_1$-$C_{20}$ aliphatic systems, one or more cycloaliphatic systems, one or more aromatic systems, or a combination of these. Also R' is a bridging group comprising one or more unsubstituted $C_1$-$C_{20}$ straight chain or branched aliphatic or alicyclic groups, or one or more substituted straight chain or branched aliphatic or alicyclic groups, or one or more aromatic groups, one or more oligomers each containing up to 12 repeating units, and when X is C or S or P, m is 1-3. Also when X=C, n=1 and y=1, and when X=S, n=2 and y=1, and when X=P, n=2 and y=2. Finally, Component (C) is a basic metal ion salt, which has the capacity to neutralize some, or all of the acidic group present in Blend Components A and B.

More particularly, the golf ball includes from 0 to 3 intermediate layers. Also, Component (A) is an ethylene/α, β-ethylenically unsaturated $C_3$-$C_{20}$ carboxylic acid copolymer or an ethylene/α, β-ethylenically unsaturated $C_3$-$C_{20}$ carboxylic acid/, β-ethylenically unsaturated $C_3$-$C_{20}$ carboxylic acid ester terpolymer. Component (B) is selected from the group consisting of amino acids, polypeptides, carbamic acids, oxamic acids, anthranillic acids and any and all mixtures thereof. Component (C) is a basic metal ion salt having a cation selected from the group consisting of, Li+, Na+, K+, Zn$^{2+}$, Ca$^{2+}$, Co$^{2+}$, Ni$^{2+}$, Cu$^{2+}$, Pb$^{2+}$, and Mg$^{2+}$.

Even more particularly, the golf ball includes from 1 to about 3 intermediate layers. Also, Component (A) is 1) a unimodal ethylene/(meth)acrylic acid copolymer or ethylene/(meth)acrylic acid/(meth)acrylate terpolymer; or 2) a bimodal polymer comprising;

a high molecular weight component having molecular weight of about 80,000 to about 500,000 and comprising one or more ethylene/$\alpha$, $\beta$-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, zinc, calcium, magnesium, and a mixture of any these; and a low molecular weight component having a molecular weight of about from about 2,000 to about 30,000 and comprising one or more ethylene/$\alpha$, $\beta$-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, magnesium, and a mixture of any these. Component (B) is selected from the group consisting of amino acids, polypeptides, carbamic acids, oxamic acids, anthranillic acids and any and all mixtures thereof. Component (C) is a basic metal ion salt having a cation selected from the group consisting of, $Li^+$, $Na^+$, $K^+$, $Zn^{2+}$, $Ca^{2+}$, and $Mg^{2+}$.

In another more detailed feature of the invention, the golf ball has 1 intermediate layer; and Component (A) is a unimodal ethylene/(meth)acrylic acid copolymer or ethylene/(meth)acrylic acid/(meth)acrylate terpolymer. Also, Component (B) is selected from the group consisting of 4,4'-methylene-bis-(cyclohexylamine)carbamate), 11-aminoundecanoicacid, 12-aminododecanoic acid, epsilon-caprolactam; omega-caprolactam, and combinations thereof; and the basic metal ion salt, Component (C), is selected from the group consisting of metal formates, metal acetates, metal nitrates, metal carbonates, metal bicarbonates, metal oxides, metal hydroxides, metal alkoxides, and combinations thereof.

In yet another more detailed feature of the invention, one or more of the core, outer cover, and/or intermediate layers (if present) of the golf ball, includes a modified ionomeric polymer comprising either; 1) a blend composition including ethylene, from 5 to 25 weight percent (meth)acrylic acid, from 0 to 40 weight percent of a $C_1$ to $C_8$-alkyl acrylate, and from about 5 to about 45 weight percent (based on the total weight of said modified ionomeric polymer), of a fatty acid or one or more metal salts of said fatty acid; or 2) a bimodal polymer blend composition comprising; a high molecular weight component having molecular weight of about 80,000 to about 500,000 and comprising one or more ethylene/$\alpha$, $\beta$-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, zinc, calcium, magnesium, and a mixture of any these; and a low molecular weight component having a molecular weight of about from about 2,000 to about 30,000 and comprising one or more ethylene/$\alpha$, $\beta$-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, magnesium, and a mixture of any these; which blend is modified with from about 5 to about 45 weight percent (based on the total weight of said modified ionomeric polymer) of a fatty acid or one or more metal salts of said fatty acid; or 3) a combination of 1) and 2); and wherein from about 40 to 100 percent of the acid groups present in said modified ionomeric polymer are neutralized with zinc, sodium, lithium, calcium, magnesium ions or any and all combinations thereof.

In yet another more detailed feature of the invention, the golf ball core further includes at least one unsaturated polymer; at least one cross-linking agent; at least one co-cross-linking agent; and optionally at least one peptizer; and optionally at least one accelerator; and optionally at least one filler.

Further, the unsaturated polymer has a Mooney viscosity ($ML_{1+4}$ (100° C.)) of from about 20 to about 80, and is selected from the group consisting of 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, and any combinations thereof. Also, the cross-linking agent is present in an amount of from about 0.05 to about 5 parts by weight of the cross-linking agents per 100 parts by weight of the unsaturated polymer. The peptizer, (if present), includes an organic sulfur compound, a metal salt of an organic sulfur compound, a non-metal salt of an organic sulfur compound a combinations thereof. The accelerator (if present), is present in an amount of from about 0.1 to about 10 parts by weight per 100 parts by weight of the unsaturated polymer. The filler, (if present) is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten steel copper, cobalt or iron, metal alloys, tungsten carbide, metal oxides, metal stearates, and other particulate carbonaceous materials, and combinations thereof.

Further, the unsaturated polymer is cis-1,4-polybutadiene and has a Mooney viscosity ($ML_{1+4}$ (100° C.)) of from about 30 to about 60. The cross-linking agent is present in an amount of from about 0.2 to about 3 parts by weight per 100 parts by weight of the unsaturated polymer. The peptizer (if present) is present in an amount of from about 0.01 to about 10 parts by weight per 100 parts by weight of the unsaturated polymer, and is selected from the group consisting of organic sulfur compounds, metal salts of an organic sulfur compound, non-metal salt of an organic sulfur compound, and combinations thereof. The accelerator, (if present), is present in an amount of from about from about 0.2 to about 5 parts by weight of the accelerator per 100 parts by weight of the unsaturated polymer.

Further, the unsaturated polymer is cis-1,4-polybutadiene and has a Mooney viscosity ($ML_{1+4}$ (100° C.)) of from about 35 to about 50. The cross-linking agent is present in an amount of from about 0.2 to about 2 parts by weight per 100 parts by weight of the unsaturated polymer. The peptizer (if present) is present in an amount of from about 0.1 to about 7 parts by weight per 100 parts by weight of the unsaturated polymer component; and is selected from the group consisting of pentachlorothiophenol, dibenzamido diphenyldisulfide, a metal salt of pentachlorothiophenol, an ammonium salt of pentachlorothiophenol with the ammonium cation having the general formula $[NR^1R^2R^3R^4]^+$ where $R^1$, $R^2$, $R^3$ and $R^4$ is either hydrogen, or a $C_1$-$C_{20}$ aliphatic, cycloaliphatic or aromatic system, and combinations thereof. The, accelerator, (if present), is present in an amount of from about 0.5 to about 1.5 parts by weight per 100 parts by weight of the unsaturated polymer and is selected from the group consisting of 2-mercapto-benzothiazole and a salt of 2-mercaptobenzothiazole.

Further, the peptizer (if present) is selected from the group consisting of pentachlorothiophenol, the zinc salt of pentachlorothiophenol, the $NH_4^+$ salt of pentachlorothiophenol, and combinations thereof and is present in an amount of from about 0.15 to about 5 parts by weight per 100 parts by weight of the unsaturated polymer component.

In another more detailed feature of the invention, the golf ball core comprises:

at least one cross-linking agent having a first characteristic decomposition temperature less than 150° C. for a $t_{1/2}$ equal to 0.1 hour; and at least one cross-linking agent having a second characteristic decomposition temperature greater than 150° C. for a $t_{1/2}$ equal to 0.1 hour.

Further, the composition weight ratio of the at least one cross-linking agent having the first characteristic decomposition temperature to the at least one cross-linking agent having the second characteristic decomposition temperature ranges from 5:95 to 95:5.

Further, the composition weight ratio of the at least one cross-linking agent having the first characteristic decomposition temperature to the at least one cross-linking agent having the second characteristic decomposition temperature ranges from 10:90 to 50:50.

In another more detailed feature of the invention, the golf ball has a C.O.R. of greater than about 0.790 at 125 ft/sec inbound velocity.

In yet another more detailed feature of the invention, one or more of the core, outer cover, and/or from 0 to 5 intermediate layers (if present) of the golf ball, further includes a polymer selected from the group consisting of thermoplastic elastomers, thermoset elastomers, synthetic rubber, thermoplastic vulcanizates, polycarbonate, polyolefin, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene catalyzed polymers, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, polysiloxane and any combination thereof.

In yet another more detailed feature of the invention the golf ball core includes a center and one or more layers disposed around said center and wherein the difference between a hardness of one layer and the next adjacent layer is greater than 2, preferably greater than 5, most preferably greater than 10 units of Shore D.

Further, the hardness of the various core components either increases outwards form core to outer core layer, or decreases outwards form core to outer core layer.

The present invention is also embodied in item of sports equipment comprising the aforementioned blend compositions. The items can include sports clothing, boots, sneakers, clogs, sandals, slip on sandals and shoes, golf shoes, tennis shoes, running shoes, athletic shoes, hiking shoes, skis, ski masks, ski boots, cycling shoes, soccer boots, golf clubs, and golf bags.

Other features and advantages of the present invention should become apparent from the following description of the preferred embodiments, taken in conjunction with the accompanying drawing, which illustrates, by way of example, the principles of the invention.

BRIEF DESCRIPTION OF THE DRAWING

Referring to the drawing in FIG. 1 there is illustrated a golf ball, 1, which comprises a solid center or core, 2, formed as a solid body of the herein described formulation and in the shape of the sphere, an intermediate layer, 3, disposed on the spherical core and an outer cover layer, 4.

DETAILED DESCRIPTION OF THE PREFERRED EMBODIMENTS AND METHODS

Figure 1:
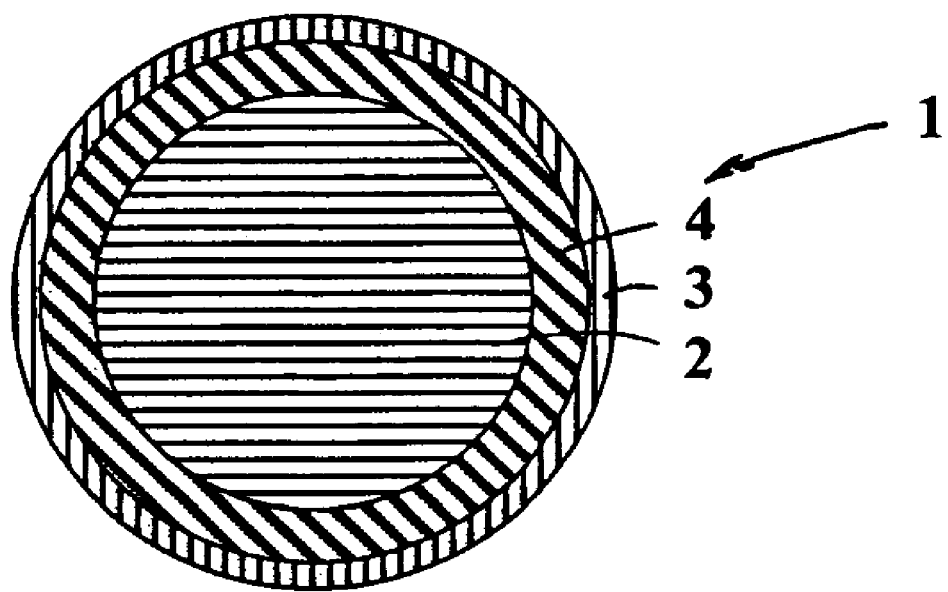

Any numerical values recited herein include all values from the lower value to the upper value in increments of one unit provided that there is a separation of at least 2 units between any lower value and any higher value. As an example, if it is stated that the amount of a component or a value of a process variable is from 1 to 90, preferably from 20 to 80, more preferably from 30 to 70, it is intended that values such as 15 to 85, 22 to 68, 43 to 51, 30 to 32 etc. are expressly enumerated in this specification. For values, which have less than one unit difference, one unit is considered to be 0.1, 0.01, 0.001, or 0.0001 as appropriate. Thus all possible combinations of numerical values between the lowest value and the highest value enumerated herein are said to be expressly stated in this application.

The term "(meth)acrylic acid copolymers" is intended to mean copolymers of methacrylic acid and/or acrylic acid.

The term "(meth)acrylate" is intended to mean an ester of methacrylic acid and/or acrylic acid.

The term "partially neutralized" is intended to mean an ionomer with a degree of neutralization of less than 100 percent.

The term "hydrocarbyl" is intended to mean any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

As used herein, the term "core" is intended to mean the elastic center of a golf ball. The core may have one or more layers of elastic material, which are usually made of rubbery material such as diene rubbers.

The term "cover layer" is intended to mean the outermost layer of the golf ball; this is the layer that is directly in contact with paint and/or ink on the surface of the golf ball. If the cover consists of two or more layers, only the outermost layer is designated the cover layer, and the remaining layers (excluding the outermost layer) are commonly designated intermediate layers as herein defined. The term outer cover layer as used herein is used interchangeably with the term "cover layer."

The term "intermediate layer" may be used interchangeably herein with the terms "mantle layer" or "inner cover layer" and is intended to mean any layer(s) in a golf ball disposed between the core and the outer cover layer. With respect to the optimization of the thickness and hardness of the intermediate layer defined herein, when pluralities of inner layers are included, the thickness and hardness of all the inner layers combined are referred to.

The term "zwitterion" is intended to mean a form of the compound having both an amine group and carboxylic acid group, Component (B), where both are charged and where the net charge on the compound is neutral.

The term "bimodal polymer" refers to a polymer comprising two main fractions and more specifically to the form of the polymers molecular weight distribution curve, i.e., the appearance of the graph of the polymer weight fraction as function of its molecular weight. When the molecular weight distribution curves from these fractions are superimposed into the molecular weight distribution curve for the total resulting polymer product, that curve will show two maxima or at least be distinctly broadened in comparison with the curves for the individual fractions. Such a polymer product is called bimodal. It is to be noted here that also the chemical compositions of the two fractions may be different.

Similarly the term "unimodal polymer" refers to a polymer comprising one main fraction and more specifically to the form of the polymers molecular weight distribution curve, i.e., the molecular weight distribution curve for the total polymer product shows only a single maximum.

The term "sports equipment" refers to any item of sports equipments such as sports clothing, boots, sneakers, clogs, sandals, slip on sandals and shoes, golf shoes, tennis shoes, running shoes, athletic shoes, hiking shoes, skis, ski masks, ski boots, cycling shoes, soccer boots, golf clubs, golf bags, and the like.

The present invention can be used in forming golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred, however diameters anywhere in the range of from 1.70 to about 2.0 inches can be used. Oversize golf balls with diameters above about 1.760 inches to as big as 2.75 inches are also within the scope of the invention.

The present invention relates to a novel blend composition suitable for use in sports equipment in general and in particular for use in golf ball manufacture. The composition is the reaction product of; (A) a polymer of ethylene and/or one or more alpha olefins, and an acid, ester, or anhydride ("Component (A)"); and (B) a compound comprising both an amine group and a carboxylic acid group in the same molecule which may be present in either a neutral or ionic or zwitterionic form ("Component (B)"); and (C) a basic metal ion salt, capable of neutralizing the acid groups of Component (A) and/or Component (B). The metal ions including $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with $Li^+$, $Na^+$, $Zn^{2+}$, $Ca^{2+}$, and $Mg^{2+}$ being preferred, and their salts include those of, for example, formic acid, acetic acid, nitric acid, sulfuric acid, carbonic acid, bicarbonic acid, as well as the metal oxides, hydroxides, and alkoxides ("Component (C)").

Blend Component (A)

Blend Component (A) is polymer of i) ethylene and/or an alpha olefin; and ii) an α, β-ethylenically unsaturated $C_3$-$C_{20}$ carboxylic acid or anhydride, or an α, β-ethylenically unsaturated $C_3$-$C_{20}$ sulfonic acid or anhydride or an α,β-ethylenically unsaturated $C_3$-$C_{20}$ phosphoric acid or anhydride and, optionally iii) a $C_1$-$C_{10}$ ester of an α, β-ethylenically unsaturated $C_3$-$C_{20}$ carboxylic acid or a $C_1$-$C_{10}$ ester of an an α, β-ethylenically unsaturated $C_3$-$C_{20}$ sulfonic acid or a $C_1$-$C_{10}$ ester of an α,β-ethylenically unsaturated $C_3$-$C_{20}$ phosphoric acid.

Preferably, the alpha-olefin of Component (A) has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred. Preferably, the carboxylic acid ester of Component (A) if present may be selected from the group consisting of vinyl esters of aliphatic carboxylic acids wherein the acids have 2 to 10 carbon atoms and vinyl ethers wherein the alkyl groups contain 1 to 10 carbon atoms.

Examples of polymers suitable for use as Component (A) include, but are not limited to, an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like.

Most preferred are ethylene/(meth)acrylic acid copolymers and ethylene/(meth)acrylic acid/alkyl (meth)acrylate terpolymers, or ethylene and/or propylene maleic anhydride copolymers and terpolymers.

The acid content of the polymer used herein as blend Component (A) may contain anywhere from 1 to 30 percent by weight acid. In some instances, it is preferable to utilize a high acid copolymer (i.e., a copolymer containing greater than 16% by weight acid, preferably from about 17 to about 25 weight percent acid, and more preferably about 20 weight percent acid).

Examples of such polymers which are commercially available include, but are not limited to, the Escor® 5000, 5001, 5020, 5050, 5070, 5100, 5110 and 5200 series of ethylene-acrylic acid copolymers sold by Exxon and the PRIMACOR® 1321, 1410, 1410-XT, 1420, 1430, 2912, 3150, 3330, 3340, 3440, 3460, 4311 and 4608 series of ethylene-acrylic acid copolymers sold by The Dow Chemical Company, Midland, Mich.

Also included are the bimodal ethylene/carboxylic acid polymers as described in U.S. Pat. No. 6,562,906 (DuPont), the entire contents of which are herein incorporated by reference. These polymers comprise ethylene/α,β-ethylenically unsaturated $C_{3-8}$ carboxylic acid high copolymers, particularly ethylene (meth)acrylic acid copolymers and ethylene, alkyl (meth)acrylate, (meth)acrylic acid terpolymers, having molecular weights of about 80,000 to about 500,000 which are melt blended with ethylene/α,β-ethylenically unsaturated $C_{3-8}$ carboxylic acid copolymers, particularly ethylene/(meth)acrylic acid copolymers having molecular weights of about 2,000 to about 30,000.

Blend Component (B)

Blend Component (B) is any compound having both an acid and an amine functionality in the same molecule. Preferred are those compounds having the general formula:

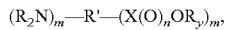

where R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids;

and X is C or S or P with the proviso that when X=C, n=1 and y=1 and when X=S, n=2 and y=1 and when X=P, n=2 and y=2. Also, m=1-3.

Examples:

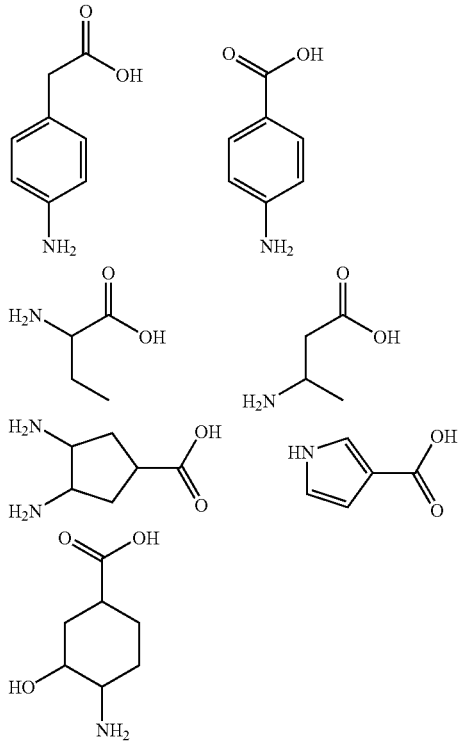

Also included are any and all or salts of the compounds of general formula $(R_2N)_m$—R'—$(X(O)_nOH_y)_m$ including but not limited to:

Ammonium salts e.g. ($^-Y$ $R_2HN^+$—R'—$X(O)_nOH$);
Acid salts e.g. ($R_2N$—R'—$X(O)O^-$ $M^+$); or
Zwitterionic salts e.g. ($^-Y$ $R_2HN^+$—R'—$X(O)_nO^-M+$);
where M+ can be $Na^+$, $K^+$, $Li^+$, $NH_4^+$, $Zn^{2+}$, $Mg^{2+}$ or $Ca^{2+}$
and $Y^-$ can be $Cl^-$, $Br^-$, $I^-$, or $ClO_4^-$
and X, R, and R' are as described above.

Any aliphatic, cycloaliphatic or aromatic moieties present in the bridging group R' may also be substituted by one or more functional groups, such functional groups including, but not limited to, carbonyl (—C(O)—), carboxylic acid (—C(O)OH), sulfonic acid (—$SO_3H$), halogens (—Cl, Br, or I), hydroxy (—OH), or thiol (—SH)—substituted derivatives.

In another embodiment, Component (B) can be a compound containing the same amine or amide functionality as described earlier but also containing an anhydride or ester group rather then the acid functionality in the molecule. When such compounds are employed it is understood that their reaction products with metal hydroxides as the metal containing base to form the corresponding carboxylate salt by hydrolysis or saponification are also included in the blend compositions of the present invention.

The compounds of said general formula $(R_2N)_m$—R'—$(X(O)_nOH_y)_m$, also include the naturally occurring amino acids for example alanine, arginine, asparagines, aspartic acid, cysteine, glutamine, glutamic acid, glycine, histidine, isoleucine, leucine, lysine, methionine, phenylalanine, proline, serine, threonine, tryptophan, tyrosine and valine and also include any and all polypeptides comprising combinations thereof.

Additional amino acids include the various synthetic amino acids including, but not limited to, caproic acid, ε-aminocaproic acid; 11-aminoundecanoic acid; and 12-aminododecanoic acid.

All the aforementioned amino acids may be in any optical isomeric form, and the amino acids and polypeptides may be in monoionic or zwitterionic form.

Also useful are derivatives of the synthetic or naturally occurring amino acids including their esters amides, lactams or anhydrides including, but not limited to, epsilon-caprolactam; omega-caprolactam, ethyl epsilon-aminocaproate; lauryl lactam; ethyl-11-aminoundecanoate; 11-aminoundecanoamide, ethyl-12-aminododecanoate; 12-aminododecanoamide, and the like.

In addition, also included under the general formula $(R_2N)_m$—R'—$(X(O)_nOH_y)_m$ are compounds in which the bridging group R' is substituted with a carbonyl group and thus the amine group in the molecule is present as an amide moiety, i.e., $(R_2N)_m$—C(O)—R'—$(X(O)_nOH_y)_m$, where R, R', X, m, n, and y are as previously stated.

Thus, also included as examples of Blend Component (B) are the various carbamic acid derivatives (parent is $NH_2$—C(O)$CO_2H$), oxamic acid (parent is $NH_2C(O)RCO_2H$) and anthranilic acids (parent is $NH_2PhCO_2H$) and their derivatives, wherein the term "derivatives" includes the carboxylic acid esters, anhydrides, halides and any and all salts thereof.

More preferably Component (B) comprises caprolactam, oenantholactam, decanolactam, undecanolactam, dodecanolactam, caproic 6-amino acid, 11-aminoundecanoicacid, 12-aminododecanoic acid, diamine hexamethylene salts of adipic acid, azeleic acid, sebacic acid and 1,12-dodecanoic acid and the diamine nonamethylene salt of adipic acid, 2-aminocinnamic acid, L-aspartic acid, 5-aminosalicylic acid, aminobutyric acid; aminocaproic acid; aminocapyryic acid; 1-(aminocarbonyl)-1-cyclopropanecarboxylic acid; aminocephalosporanic acid; aminobenzoic acid; aminochlorobenzoic acid; 2-(3-amino-4-chlorobenzoyl)benzoic acid; aminonaphtoic acid; aminonicotinic acid; aminonorbornanecarboxylic acid; aminoorotic acid; aminopenicillanic acid; aminopentenoic acid; (aminophenyl)butyric acid; aminophenyl propionic acid; aminophthalic acid; aminofolic acid; aminopyrazine carboxylic acid; aminopyrazole carboxylic acid; aminosalicylic acid; aminoterephthalic acid; aminovaleric acid; ammonium hydrogencitrate; anthranillic acid; aminobenzophenone carboxylic acid; aminosuccinamic acid, epsilon-caprolactam; omega-caprolactam, (carbamoylphenoxy)acetic acid, sodium salt; carbobenzyloxy aspartic acid; carbobenzyl glutamine; carbobenzyloxyglycine; 2-aminoethyl hydrogensulfate; aminonaphthalenesulfonic acid; aminotoluene sulfonic acid; 4,4'-methylene-bis-(cyclohexylamine) carbamate and ammonium carbamate.

Most preferably Component (B) comprises 4,4'-methylene-bis-(cyclohexylamine)carbamate (commercially available from R.T. Vanderbilt Co., Norwalk Conn. under the tradename Diak® 4), 11-aminoundecanoicacid, 12-aminododecanoic acid, epsilon-caprolactam; and omega-caprolactam.

Also included as Component (B) are any and all combinations mixtures of the materials described above.

Blend Component (C)

Blend Component (C) is a basic metal ion salt, which has the capacity to neutralize some or all of the acidic group present in Blend Components A and B. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Zn^{2+}$, $Ca^{2+}$, and $Mg^{2+}$ being preferred. The basic metal ion salts include, but are not limited to, those of for example formic acid, acetic acid, nitric acid, and carbonic acid, hydrogen carbonate salts, oxides, hydroxides, and alkoxides.

In order to prepare the blend compositions of the present invention, Components (A), (B) and (C) may be mixed in any order in a single mixing or reaction vessel in any and all possible combinations and relative amounts.

Alternatively any two components of the blend may be mixed separately and isolated followed by subsequent addition of the third.

In another embodiment of expressly included in, the blend compositions of the present invention is the blend resulting from the reaction of the aforementioned blend Component (B) with one or more ionomers.

The preparation of ionomers is well known, for example see U.S. Pat. No. 3,264,272 (the entire contents of which are herein incorporated by reference). Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer." The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Co^{2+}$, $Ni^{2+}$, $Cu^{2+}$, $Pb^{2+}$, $Ca^{2+}$, and $Mg^{2+}$, with the $Li^+$, $Na^+$, $Zn^{2+}$, $Ca^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it was also well known that, as a general rule, the hardness of these cover materials could be increased with increasing acid content. Hence, in Research Disclosure 29703, published in January 1989, DuPont first disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers are typically defined as those ionomer resins with acrylic or methacrylic acid units present from 16 wt. % to about 35 wt. % in the polymer. Generally, such a high acid ionomer will have a flexural modulus from about 50,000 psi to about 125,000 psi.

Ionomer resins can further comprise a softening comonomer, which is typically present from about 10 wt. % to about 50 wt. % in the polymer. Such ionomers will have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth) acrylic acid and (meth)acrylate, all of which may be used as a component of the balls of the present invention. The properties of these ionomer resins can vary widely due to variations in acid content, softening comonomer content, the degree of neutralization, and the type of metal ion used in the neutralization. The full range commercially available typically includes ionomers of polymers of general formula, E/X/Y, where E is ethylene, X is a softening comonomer such as acrylate or methacrylate present in an amount of from 0 wt. % to about 50 wt. % of the polymer, and Y is acrylic or methacrylic acid present in an amount from about 5 wt. % to about 35 wt. % of the polymer, and wherein the acid moiety is neutralized from about 1% to about 90% to form an ionomer with a cation such as lithium, sodium, potassium, magnesium, calcium, barium, lead, tin, zinc or aluminum, or a combination of such cations.

The novel blend composition of the present invention, may also be prepared by reaction of Component (B) with the so-called bimodal ionomers as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:

a) a high molecular weight component having molecular weight of about 80,000 to about 500,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, zinc, calcium, magnesium, and a mixture of any these; and b) a low molecular weight component having a molecular weight of about from about 2,000 to about 30,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, magnesium, and a mixture of any these.

In addition to the unimodal and bimodal ionomers, the novel blend composition of the present invention, may be prepared by reaction of Component (B) with one or more so-called "modified ionomers" examples of which are described in U.S. Pat. Nos. 6,100,321, 6,329,458 and 6,616, 552 and U.S. Patent Publication U.S. 2003/0158312 A1, the entire contents of all of which are herein incorporated by reference.

Specifically, the novel blend composition of the present invention may be prepared by reaction of Component (B) with one or more modified unimodal ionomers prepared by mixing:

a) an ionomeric polymer comprising ethylene, from 5 to 25 weight percent (meth)acrylic acid, and from 0 to 40 weight percent of a (meth)acrylate monomer, said ionomeric polymer neutralized with metal ions selected from the group consisting of lithium, sodium, zinc, calcium, magnesium, and a mixture of any these, and b) from about 5 to about 40 weight percent (based on the total weight of said modified ionomeric polymer) of one or more fatty acids or metal salts of said fatty acid, the metal selected from the group consisting of calcium, sodium, zinc, potassium, and lithium, barium and magnesium and the fatty acid preferably being stearic acid.

Alternatively, the novel blend composition of the present invention, may be prepared by reaction of Component (B) with one or more modified bimodal ionomers, which are based ionomers derived from the earlier described bimodal ethylene/carboxylic acid polymers (as described in U.S. Pat. No. 6,562,906, the entire contents of which are herein incorporated by reference), and are prepared by mixing;

a) a high molecular weight component having molecular weight of about 80,000 to about 500,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, zinc, calcium, potassium, magnesium, and a mixture of any of these; and b) a low molecular weight component having a molecular weight of about from about 2,000 to about 30,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, potassium, magnesium, and a mixture of any of these; and c) from about 5 to about 40 weight percent (based on the total weight of said modified ionomeric polymer) of one or more fatty acids or metal salts of said fatty acid, the metal selected from the group consisting of calcium, sodium, zinc, potassium and lithium, barium and magnesium and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The generic formula for all fatty and waxy acids above acetic acid is $CH_3(CH_2)_x COOH$, wherein the carbon atom count includes the carboxyl group. The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to stearic acid ($C_{18}$, i.e., $CH_3 (CH_2)_{16} COOH$), palmitic acid ($C_{16}$, i.e., $CH_3 (CH_2)_{14} COOH$), pelargonic acid ($C_9$, i.e., $CH_3 (CH_2)_7 COOH$) and lauric acid ($C_{12}$, i.e., $CH_3 (CH_2)_{10} OCOOH$). Examples of suitable unsaturated fatty acids, i.e., a fatty acid in which there are one or more double bonds between the carbon atoms in the alkyl chain, include but are not limited to oleic acid ($C_{13}$, i.e., $CH_3 (CH_2)_7 CH:CH(CH_2)_7 COOH$).

The source of the metal ions used to produce the metal salts of the fatty or waxy acid salts used in the various modified ionomers are generally various metal salts which provide the metal ions capable of neutralizing, to various extents, the carboxylic acid groups of the fatty acids. These include the sulfate, carbonate, acetate and hydroxylate salts of zinc, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of said fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion.

An example of such a modified ionomer polymer is DuPont® HPF-1000 available from E. I DuPont de Nemours and Co. Inc.

A preferred blend composition of the present invention, may be prepared by reaction of Component (B), with one or more of the unimodal ionomers, bimodal ionomers, or modified unimodal or bimodal ionomeric polymers as described herein, and further blended with a zinc neutralized ionomer of a polymer of general formula E/X/Y where E is ethylene, X is a softening comonomer such as acrylate or methacrylate and is present in an amount of from 0 to about 50, preferably 0 to about 25, most preferably 0, and Y is acrylic or methacrylic acid and is present in an amount from about 5 wt. % to about 25, preferably from about 10 to about 25, most preferably from about 10 to about 20 wt %.

In all of the aforementioned blend compositions of the present invention, i.e., the blends comprising Components (A), (B) and (C); or the blends comprising Component (B) and either one or more of a unimodal ionomer, bimodal ionomer, modified unimodal ionomer, or modified bimodal ionomer, Component (B) is present in an amount of from about 0.1 to about 40, preferably from about 1 to about 20, and most preferably from about 1 to about 15 phr (based on the final weight of the blend composition).

A variety of mixing methods can be use to prepare the blend compositions of the present invention, which include, bit are not limited to, dry blending, calendaring, use of Banbury mixer, use of an extruder or by injection molding. The preferred process methods are using single or twin-screw extruders to achieve a desirable dispersive mixing, distributive mixing, or both.

In another embodiment of the present invention, the resulting blend composition can then be used in the manufacture of a golf ball comprising a core, a cover layer and, optionally, one or more inner cover layers. In one preferred embodiment, a golf ball is disclosed in which the core comprises the novel composition of the present invention. In another preferred embodiment, a golf ball is disclosed in which the cover layer comprises the novel composition of the present invention. In another preferred embodiment, a golf ball is disclosed in which at least one intermediate layer comprises the novel composition of the present invention.

Golf Ball Core

With reference now to the FIGURE, there is illustrated a golf ball a golf ball, 1, which comprises a solid center or core, 2, formed as a solid body of the herein described formulation and in the shape of the sphere, an intermediate layer, 3, disposed on the spherical core and an outer cover layer, 4.

In one preferred embodiment, a golf ball is disclosed in which the core comprises the novel composition of the present invention. In addition, the core may also comprises the following components:

A. Unsaturated Polymer

The core of the golf ball of the present invention comprises an unsaturated polymer. Unsaturated polymers suitable for use in the golf balls of the present invention include any polymeric material having an unsaturation, either hydrocarbon or non-hydrocarbon, capable of participating in a cross-linking reaction initiated thermally, chemically, by irradiation, or by a combination of these methods. The unsaturated polymer can be any rubber commonly used in conventional one-piece golf balls and the cores of multi-layered golf balls. Non-limiting examples of suitable unsaturated polymers include 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, as well as mixtures of these.

Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization.

The polybutadiene component may be synthesized by using rare earth-based catalysts, nickel-based catalysts, or cobalt-based catalysts, conventionally used in this field. Polybutadiene obtained by using lanthanum rare earth-based catalysts is usually synthesized by polymerizing butadiene in the presence of a catalyst comprising a combination of a lanthanum rare earth-compound, an organic aluminum compound, a Lewis base and, upon necessity, a Lewis acid. The lanthanum rare earth-compound may be a compound containing a rare earth atom (atomic number of 57 to 71), but particularly preferred is a neodymium compound.

Examples of the nickel-based catalysts may include a one-component type such as nickel diatomaceous earth; a two-component type such as Raney-nickel/titanium tetrachloride; and a three-component type such as a nickel compound/organic metal/boron trifluoride etherate. Examples of nickel compounds may include reduced nickel with carrier, Raney-nickel, nickel oxide, nickel carboxylate, and a complex salt of organic nickel. Examples of the organic metals may include a trialkyl aluminum such as triethyl aluminum, tri-n-propyl aluminum, tri-isobutyl aluminum, or tri-n-hexyl aluminum; an alkyl lithium such as n-butyl lithium, sec-butyl lithium, tert-butyl lithium, or 1,4-dibutane lithium; and a dialkyl zinc such as diethyl zinc or dibutyl zinc.

Examples of the cobalt-based catalysts may include, as cobalt and compounds thereof, Raney-cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyl dithiocarbamate, cobalt anilinium nitrite, and cobalt dinitrosyl chloride. In particular, each of these compounds is preferably combined with a dialkyl aluminum monochloride such as diethyl aluminum monochloride or diisobutyl aluminum monochloride, a trialkyl aluminum such as triethyl aluminum, tri-n-propyl aluminum, triisobutyl aluminum or tri-n-hexyl aluminum, an aluminum alkyl sesquichloride such as ethyl aluminum sesquichloride, or aluminum chloride.

The 1,4-polybutadiene rubbers have a molecular weight distribution (Mw/Mn) of from about 1.2 to about 4.0, preferably from about 1.7 to about 3.7, even more preferably from about 2.0 to about 3.5, most preferably from about 2.2 to about 3.2.

The polybutadiene rubbers have a Mooney viscosity ($ML_{1+4}$ (100° C.)) of from about 20 to about 80, preferably from about 30 to about 70, even more preferably from about 30 to about 60, most preferably from about 35 to about 50.

The term "Mooney viscosity" used herein refers in each case to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

The 1,4-polybutadiene rubbers may also be blended with natural rubber, polyisoprene rubber, styrene-butadiene rubber, or the like. At least 80% by weight of 1,4-polybutadiene rubber should be present in the base rubber, because base rubbers containing less 1,4-polybutadiene rubber often fail to take advantage of the rebound resilience of the polybutadiene rubber.

Many different types of 1,2-polybutadienes exist, having widely varying physical properties as a result of their differing tacticity, crystallinity, and molecular weight. Examples of 1,2-polybutadienes having differing tacticity, all of which are suitable as unsaturated polymers for use in the present invention, are atactic 1,2-polybutadiene, isotactic 1,2-polybutadiene, and syndiotactic 1,2-polybutadiene. Syndiotactic polymers include alternating base units that are enantiomers of each other. These 1,2-polybutadienes are also differentiated by their crystallinity, which ranges from amorphous 1,2-polybutadienes that essentially lack crystallinity to semi-crystalline 1,2-polybutadienes of varying crystallinities. The molecular weights of these 1,2-polybutadienes can also vary greatly. The various combinations of tacticity, crystallinity, and molecular weight provide for many different types of 1,2-polybutadienes having very different processability, as well as other chemical, thermal, mechanical, and rheological properties.

Syndiotactic 1,2-polybutadiene having a crystallinity suitable for use as an unsaturated polymer in compositions within the scope of the present invention are polymerized from a 1,2-addition of butadiene. Golf balls within the scope of the present invention include syndiotactic 1,2-polybutadiene having crystallinity and greater than about 70% of 1,2-bonds, more preferably greater than about 80% of 1,2-bonds, and most preferably greater than about 90% of 1,2-bonds. Also, golf balls within the scope of the present invention may include syndiotactic 1,2-polybutadiene having a crystallinity between about 5% and about 50%, more preferably between about 10% and about 40%, and most preferably between about 15% and about 30%. In addition, golf balls within the scope of the present invention may include syndiotactic 1,2-polybutadiene having crystallinity and a mean molecular weight between about 10,000 and about 350,000, more preferably between about 50,000 and about 300,000, more preferably between about 80,000 and about 200,000, and most preferably between about 10,000 and about 150,000. Examples of suitable syndiotactic 1,2-polybutadienes having crystallinity suitable for use in golf balls within the scope of the present invention are sold under the trade names RB810, RB820, and RB830 by JSR Corporation of Tokyo, Japan. These have more than 90% of 1,2 bonds, a mean molecular weight of approximately 120,000, and a crystallinity between about 15% and about 30%.

In one embodiment of the present invention the core may comprise a center and one or more core layers disposed around the center. These core layers may be made from the same rubber as used in the center portion, or may be a different thermoplastic elastomer. The various core layers (including the center) may each exhibit a different hardness. The difference between the center hardness and that of the next adjacent layer, as well as the difference in hardness between the various core layers is greater than 2, preferably greater than 5, most preferably greater than 10 units of Shore D.

In one preferred embodiment, the hardness of the center and each sequential layer increases progressively outwards from the center to outer core layer.

In another preferred embodiment, the hardness of the center and each sequential layer decreases progressively inwards from the outer core layer to the center.

B. Cross-Linking Agents

Suitable cross-linking agents for use in the golf balls of the present invention include peroxides, sulfur compounds, or other known chemical cross-linking agents, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxy-isopropyl)benzene; t-butylperoxybenzoate; 2,5-dimethyl-2,5-di-(t-butylperoxy)hexyne-3, such as Trigonox 145-45B, marketed by Akrochem Corp. of Akron, Ohio; 1,1-bis(t-butylperoxy)-3,3,5 tri-methylcyclohexane, such as Varox 231-XL, marketed by R.T. Vanderbilt Co., Inc. of Norwalk, Conn.; and di-(2,4-dichlorobenzoyl)peroxide. The cross-linking agents can be blended in total amounts of about 0.05 part to about 5 parts, more preferably about 0.2 part to about 3 parts, and most preferably about 0.2 part to about 2 parts, by weight of the cross-linking agents per 100 parts by weight of the unsaturated polymer.

Each cross-linking agent has a characteristic decomposition temperature at which 50% of the cross-linking agent has decomposed when subjected to that temperature for a specified time period ($t_{1/2}$). For example, 1,1-bis-(t-butylperoxy)-3,3,5-tri-methylcyclohexane at $t_{1/2}$=0.1 hr has a decomposition temperature of 138° C. and 2,5-dimethyl-2,5-di-(t-butylperoxy)hexyne-3 at $t_{1/2}$=0.1 hr has a decomposition temperature of 182° C. Two or more cross-linking agents having different characteristic decomposition temperatures at the same $t_{1/2}$ may be blended in the composition. For example, where at least one cross-linking agent has a first characteristic decomposition temperature less than 150° C., and at least one cross-linking agent has a second characteristic decomposition temperature greater than 150° C., the composition weight ratio of the at least one cross-linking agent having the first characteristic decomposition temperature to the at least one cross-linking agent having the second characteristic decomposition temperature can range from 5:95 to 95:5, or more preferably from 10:90 to 50:50.

Besides the use of chemical cross-linking agents, exposure of the composition to radiation also can serve as a cross-linking agent. Radiation can be applied to the unsaturated polymer mixture by any known method, including using microwave or gamma radiation, or an electron beam device. Additives may also be used to improve radiation curing of the diene polymer.

C. Co-Cross-Linking Agent

The rubber and cross-linking agent may be blended with a co-cross-linking agent, which may be a metal salt of an unsaturated carboxylic acid. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in a rubber either as a preformed metal salt, or by introducing an α,β-unsaturated carboxylic acid and a metal oxide or hydroxide into the rubber composition, and allowing them to react in the rubber composition to form a metal salt. The unsaturated carboxylic acid metal salt can be blended in any desired amount, but preferably in amounts of about 10 parts to about 60 parts by weight of the unsaturated carboxylic acid per 100 parts by weight of the unsaturated polymer.

D. Peptizer

The compositions used to formulate the cores of the balls of the present invention may also incorporate one or more peptizers. By the term "peptizer" is meant chemicals that inhibit cross-linking during the initial processing of unsaturated polymers, but then participate in the cross-linking of the unsaturated polymer once cross-linking has commenced.

The peptizer preferably comprises an organic sulfur compound and/or its metal or non-metal salt. Examples of such organic sulfur compounds include thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl) disulfide; dibenzamido diphenyldisulfide (DBDD), and alkylated phenol sulfides, such as VULTAC marketed by Atofina Chemicals, Inc. of Philadelphia, Pa. Preferred organic sulfur compounds include pentachlorothiophenol, and dibenzamido diphenyldisulfide.

Examples of the metal salt of an organic sulfur compound include sodium, potassium, lithium, magnesium calcium, barium, cesium and zinc salts of the above-mentioned thiophenols and thiocarboxylic acids, with the zinc salt of pentachlorothiophenol being most preferred.

Examples of the non-metal salt of an organic sulfur compound include ammonium salts of the above-mentioned thiophenols and thiocarboxylic acids wherein the ammonium cation has the general formula $[NR^1R^2R^3R^4]^+$ where $R^1$, $R^2$, $R^3$ and $R^4$ is either hydrogen, or a $C_1$-$C_{20}$ aliphatic, cycloaliphatic or aromatic moiety, or any and all combinations thereof, with the most preferred being the $NH_4^+$-salt of pentachlorothiophenol.

The peptizer, if employed in the cores of the golf balls of the present invention, is present in an amount of from about 0.01 to about 10, preferably of from about 0.10 to about 7, more preferably of from about 0.15 to about 5 parts by weight per 100 parts by weight of the unsaturated polymer component.

E. Accelerators

The golf ball composition can comprise one or more accelerators of one or more classes. Accelerators added to an unsaturated polymer increase the vulcanization rate and/or decrease the vulcanization temperature of the unsaturated polymers. Accelerators can be of any class known for rubber processing including mercapto-, sulfenamide-, thiuram, dithiocarbamate, dithiocarbamylsulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in *The Vanderbilt Rubber Handbook:* 13$^{th}$ Edition (1990, R.T. Vanderbilt Co.), pp. 296-330, in *Encyclopedia of Polymer Science and Technology*, Vol. 12 (1970, John Wiley & Sons), pp. 258-259, and in *Rubber Technology Handbook* (1980, Hanser/Gardner Publications), pp. 234-236. Preferred accelerators include 2-mercaptobenzothiazole (MBT) and its salts.

The ball composition can further incorporate from about 0.1 part to about 10 parts by weight of the accelerator per 100 parts by weight of the unsaturated polymer. More preferably, the ball composition can further incorporate from about 0.2 part to about 5 parts, and most preferably from about 0.5 part to about 1.5 parts, by weight of the accelerator per 100 parts by weight of the unsaturated polymer.

Golf balls within the scope of the present invention can be prepared by molding the rubber composition as formulated above into a core of desired size and vulcanizing the rubber by heating. The manufacture of these spheres can be in accord with conventional methods and conditions of manufacture. Once the cores have been made the various inner and outer cover layers are then formed over them.

Intermediate Layer(s) and Cover Layer

Again referring to the drawing in FIG. 1, there is illustrated a golf ball 1, which comprises a solid center or core 2, formed as a solid body of the herein described formulation and in the shape of the sphere, an intermediate layer 3, disposed on the spherical core and an outer cover layer 4.

The golf ball of the present invention comprise from 0 to 5, preferably from 0 to 3, more preferably from 1 to 3, most preferably 1 to intermediate layer(s).

In one embodiment of the present invention, at least one of the intermediate layers and/or core layers comprise the novel blend compositions of the present invention.

In addition to the novel blend composition, the core, intermediate, or outer cover layers of the golf ball of the present invention can further incorporate one or more additional polymers. Examples of suitable additional polymers for use in the present invention include, but are not limited to, the following: thermoplastic resins, thermoset resins, polyurethane resins, polyester resins, polyamide elastomer resins, polyamide-ionomer, polyurethane ionomer, thermoplastic copolyetherester block copolymer, thermoplastic copolyesterester block copolymer, thermoplastic elastomer, thermoset elastomer, synthetic rubber, thermoplastic vulcanizate, copolymeric ionomer, terpolymeric ionomer, polyurethane ionomer, polyamide ionomer, polycarbonate, polyolefin, polyamide, copolymeric polyamide, polyester, polyvinyl alcohol, acrylonitrile-butadiene-styrene copolymer, polyarylate, polyacrylate, polyphenylene ether, impact-modified polyphenylene ether, high impact polystyrene, diallyl phthalate polymer, metallocene catalyzed polymer, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane or any metallocene-catalyzed polymers of these species.

Suitable polyamides for use as an additional material in compositions within the scope of the present invention also include resins obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as $\epsilon$-caprolactam or $\omega$-laurolactam; (3) polycondensation of an aminocarboxylic acid, such as 6-aminocaproic acid, 9-aminononanoic acid, 1-aminoundecanoic acid or 12-aminododecanoic acid; or (4) copolymerization of a cyclic lactam with a dicarboxylic acid and a diamine. Specific examples of suitable polyamides include nylon 6, nylon 66, nylon 610, nylon 612, nylon 11, nylon 12, copolymerized nylon, nylon MXD6, and nylon 46.

Other preferred materials suitable for use as an additional material in compositions within the scope of the present invention include polyester elastomers marketed under the tradename SKYPEL™ by SK Chemicals of South Korea, or diblock or triblock copolymers marketed under the tradename SEPTON™ by Kuraray Corporation of Kurashiki, Japan, and KRATON™ by Kraton Polymers Group of Companies of Chester, United Kingdom. All of the materials listed above can provide for particular enhancements to ball layers prepared within the scope of the present invention.

The various polymer compositions used to prepare the golf balls of the present invention can also incorporate one or more fillers. Such fillers are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The appropriate amounts of filler required will vary depending on the application but typically can be readily determined without undue experimentation.

The filler preferably is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten steel copper, cobalt or iron, metal alloys, tungsten carbide, metal oxides, metal stearates, and other particulate carbonaceous materials, and any and all combinations thereof. Preferred examples of fillers include metal oxides, such as zinc oxide and magnesium oxide. In another preferred embodiment the filler comprises a continuous or non-continuous fiber. In another preferred embodiment the filler is employed in the composition used to prepare the inner cover layer and has a higher density than that of the modified ionomeric polymer component of the inner cover layer.

If desired, the various polymer compositions used to prepare the golf balls of the present invention can additionally contain other conventional additives such as plasticizers, pigments, antioxidants, U.V. absorbers, optical brighteners, or any other additives generally employed in plastics formulation or the preparation of golf balls. The appropriate amounts for these materials can be readily determined without undue experimentation.

Typically, the golf ball core is made by mixing together the various components and other additives with or without melting them. Dry blending equipment, such as a tumble mixer, V-blender, ribbon blender, or two-roll mill, can be used to mix the compositions. The golf ball compositions can also be mixed using a mill, internal mixer such as a Banbury or Farrel continuous mixer, extruder or combinations of these, with or without application of thermal energy to produce melting.

The various core components can be mixed together with the cross-linking agents, or each additive can be added in an appropriate sequence to the milled unsaturated polymer. In another method of manufacture the cross-linking agents and other components can be added to the unsaturated polymer as part of a concentrate using dry blending, roll milling, or melt mixing. If radiation is a cross-linking agent, then the mixture comprising the unsaturated polymer and other additives can be irradiated following mixing, during forming into a part such as the core of a ball, or after forming.

The resulting mixture can be subjected to, for example, a compression or injection molding process, to obtain solid spheres for the core. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which initiate cross-linking. The temperature and duration of the molding cycle are selected based upon the type of peroxide and peptizer selected. The molding cycle may have a single step of molding the mixture at a single temperature for fixed time duration.

For example, a preferred mode of preparation for the cores used in the present invention is to first mix the core ingredients on a two-roll mill to form slugs of approximately 30-40 g and then compression mold in a single step at a temperature between 150 to 180° C. for times between 5 and 12 minutes.

The various core components may also be combined to form a golf ball by an injection molding process, which is also well known to one of ordinary skill in the art. Although the curing time depends on the various materials selected, those of ordinary skill in the art will be readily able to adjust the curing time upward or downward based on the particular materials used and the discussion herein.

The various intermediate layer and/or cover formulations may be produced using a twin-screw extruder or can be blended manually or mechanically prior to the addition to the injection molder feed hopper. Finished golf balls may be prepared by initially positioning the solid preformed core in an injection-molding cavity followed by uniform injection of the intermediate and/or cover layer composition sequentially over the core. The cover formulations can be injection molded around the cores to produce golf balls of the required diameter.

Alternatively, the cover layers may also be formed around the core by first forming half shells by injection molding followed by compression molding the half shells about the core to form the final ball.

Covers may also be formed around the cores using compression molding. Cover materials for compression molding may also be extruded or blended resins or castable resins.

The use of the novel blend compositions in the various components of a golf ball such as the core, intermediate layers and/or covers allows for increases in C.O.R. and modulus in the materials of construction while also improving the materials processability.

The improved properties novel blend composition, especially in terms improved modulus and processability, also results in the utility of the blends in the preparation of sports equipment items other than golf balls. Thus another embodiment of the present invention is sports equipment item comprising the blend composition. These items include, but are not limited to, sports clothing, boots, sneakers, clogs, sandals, slip on sandals and shoes, golf shoes, tennis shoes, running shoes, athletic shoes, hiking shoes, skis, ski masks, ski boots, cycling shoes, soccer boots, golf clubs, and golf bags.

EXAMPLES

Examples of the invention are given below by way of illustration and not by way of limitation.

The materials employed in the blend formulations in Table 1 were as follows:

Surlyn 991.0 is a grade of ionomer commercially available from DuPont, and is a zinc ionomer of an ethylene/methacrylic acid polymer.

Surlyn 9120 is a grade of ionomer commercially available from DuPont, and is a zinc ionomer of an ethylene/methacrylic acid polymer.

Diak® 4 is 4,4'-methylene-bis-(cyclohexylamine) carbamate commercially available from R.T. Vanderbilt Co., Norwalk Conn.

11-amino-undecanoic acid is commercially available from the Sigma-Aldrich Company.

12-amino-undecanoic acid is commercially available from the Sigma-Aldrich Company.

Sodium stearate is commercially available from the Sigma-Aldrich Company.

By blending the ingredients set forth in the Table 1 below, a series of cover formulations were produced using a twin screw extruder. The resulting pellets were then injection molded at around 400° F. to make either test specimens in the form of ASTM Type IV test bars or alternatively spheres of 1.52 in diameter. All materials were molded under essentially identical conditions.

The properties of Tensile Strength, Tensile Elongation, Flexural Strength, Flexural Modulus, PGA compression, C.O.R., Shore D hardness on both the materials and the resulting ball were conducted using the test methods as defined below.

Core or ball diameter was determined by using standard linear calipers or size gauge.

Core specific gravity was determined by electronic densimeter using ASTM D-792.

Compression is measured by applying a spring-loaded force to the golf ball center, golf ball core, or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160−Riehle Compression).

Thus, a Riehle compression of 100 would be the same as an Atti compression of 60.

Coefficient of restitution (C.O.R.) of the cores or balls was measured by firing the core or ball using an air cannon at a velocity of 125 feet per second inbound velocity against a steel plate, which is positioned 81 in from the muzzle of the cannon. The rebound velocity was then measured via a timing mechanism using three light gates. The rebound velocity was divided by the inbound velocity to give the coefficient of restitution.

Shore D hardness was measured in accordance with ASTM Test D2240. Hardness of a layer was measured on the ball, perpendicular to a land area between the dimples.

The ball performance was determined using a Robot Driver Test, which utilized a commercial swing robot in conjunction with an optical system to measure ball speed, launch angle, and backspin after a golf ball is hit with a driver. In this test, a titanium driver is attached to a swing robot and the swing speed and power profile as well as tee location and club lie angle is setup to generate the following values using a Maxfli XS Tour golf ball as a reference:

Headspeed: 112 mph
Ballspeed: 160 mph
Launch Angle: 9 deg
Backspin: 3200 rpm

Then, the test ball was substituted for the reference ball and the corresponding values determined.

The various compositions are summarized in Table 1 and the various test results on the balls are summarized in Table 2.

Comparing Comp Ex 1 with Examples 1-4 illustrate that the addition of Diak 4 at levels of only 3-10 phr to a medium acid ionomer, Surlyn 9910 (15 wt %  acid) results in a dramatic improvement in C.O.R. from 0.68-0.69 to values of 0.76-0.77, which correspond to C.O.R. values for ionomers of much higher acid content. Also the addition of the Diak 4 caused an increase in the flexural modulus over the ionomer of Comparative Example 1. Further analysis of the data for Examples 1-4 show that increasing the amount of Diak 4 from 3-10 phr while maintaining the increased C.O.R. and tensile properties also results in an increase in flexural strength and modulus but unexpectedly also improves the processability of the composition as shown by the increase in MFI.

Comparison of Examples 5-7 with Comp Ex 2 again illustrate that the addition of Diak 4 at levels of only 3-7 phr to a high acid ionomer, Surlyn 9120 (>15 wt % acid) also results in a dramatic improvement in C.O.R. from 0.70 to values of 0.75-0.78. Again, the further addition of the Diak 4 caused an increase in the flexural modulus over the ionomer of Comparative Example 2. Further analysis of the data for Examples 1-4 show that increasing the amount of Diak 4 from 3-7 phr also resulted in further increases in C.O.R., tensile properties and flexural strength and modulus while again unexpectedly improving the processability of the composition as shown by the increase in MFI.

A similar trend is also observed for 11-aminoundecanoic acid as shown by comparison of Examples 8-13 with Comparative Examples 1 and 2. Again as compared to both the base medium and high acid ionomer a large increase in C.O.R. and flexural modulus was observed on addition of the 11-aminoundecanoic acid, with even more pronounced increases in processability as shown by the increase in MFI.

TABLE 1

Article I. Compositions Used in this Study*

| Material | Ex 1 | Ex 2 | Ex 3 | Ex 4 | Ex 5 | Ex 6 | Ex 7 | Ex 8 | Ex 9 | Ex 10 | Ex 11 | Ex 12 | Ex 13 | Ex 14 | Ex 15 | Ex 16 | Comp Ex 1 | Comp Ex 2 |
|---|---|---|---|---|---|---|---|---|---|---|---|---|---|---|---|---|---|---|
| Surlyn 9910 | 100 | 100 | 100 | 100 | | | | 100 | 100 | 100 | | | | 100 | 100 | 100 | 100 | |
| Surlyn 9120 | | | | | 100 | 100 | 100 | | | | 100 | 100 | 100 | | | | | 100 |
| Surlyn 8140 | | | | | | | | | | | | | | | | | | |
| Surlyn 6120 | | | | | | | | | | | | | | | | | | |
| Surlyn 8320* | | | | | | | | | | | | | | | | | | |
| Surlyn 9320* | | | | | | | | | | | | | | | | | | |
| SEP 1290-1 | | | | | | | | | | | | | | | | | | |
| Diak 4** | 3 | 5 | 7 | 10 | 3 | 5 | 7 | | | | | | | | | | | |
| 11-amino-undecanoic acid | | | | | | | | 3 | 5 | 7 | 3 | 5 | 7 | | | | | |
| 12-amino-undecanoic acid | | | | | | | | | | | | | | 5 | 10 | 5 | | |
| Sodium stearate | | | | | | | | | | | | | | | | 10 | | |

*All amounts in pph

TABLE 2

Properties of Compositions Used in this Study

| Property | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|
| Tensile Strength (psi) | 3723 | 3576 | 3621 | 3639 | 4868 | 4715 | 4761 | 4206 | 4134 | 4003 |
| Tensile Elongation (psi) | 123 | 121 | 118 | 116 | 135 | 141 | 137 | 128 | 138 | 133 |
| Flexural Strength (psi) | 462 | 477 | 493 | 550 | 697 | 766 | 777 | 534 | 563 | 593 |
| Flexural Modulus (kpsi) | 48.8 | 50.5 | 51.9 | 58 | 88.5 | 93 | 95.7 | 57.4 | 60.1 | 63.1 |
| MFI (g/10 min.) | 4.8 | 7.8 | 7.2 | 9.2 | 1 | 0 | 0 | 24.7 | 18.6 | 22 |
| C.O.R[1] | | | | | 0.755 | 0.769 | 0.776 | 0.737 | 0.753 | 0.761 |
| Compression[1] | | | | | 155 | 160 | 162 | 156 | 158 | 161 |
| Shore D Hardness[1] | | | | | 67.6 | 68.5 | 67.3 | 63.6 | 65 | 66.2 |

TABLE 2-continued

Properties of Compositions Used in this Study

| | | | | | | | | | | |
|---|---|---|---|---|---|---|---|---|---|---|
| C.O.R² | 0.767 | 0.77 | 0.766 | 0.77 | 0.756 | 0.777 | 0.785 | 0.743 | 0.763 | 0.771 |
| Compression² | 162 | 161 | 162 | 164 | 162 | 164 | 164 | 160 | 163 | 164 |
| Shore D Hardness² | 64.9 | 65.9 | 64.9 | 67.2 | 67.6 | 67.2 | 69.9 | 64.5 | 66.5 | 67.0 |

| Property | Ex 11 | Ex 12 | Ex 13 | Ex 14 | Ex 15 | Ex 16 | Comp Ex 1 | Comp Ex 2 |
|---|---|---|---|---|---|---|---|---|
| Tensile Strength (psi) | 3823 | 3878 | 3833 | 4884 | 4736 | 4909 | 3600 | 5300 |
| Tensile Elongation (psi) | 175 | 200 | 185 | 106 | 140 | 110 | 290 | 345 |
| Flexural Strength (psi) | 683 | 685 | 650 | 453 | 642 | 514 | | |
| Flexural Modulus (kpsi) | 73.8 | 72.4 | 68.7 | 65.7 | 78.7 | 70 | 48 | 62 |
| MFI (g/10 min.) | 24.1 | 23.9 | too high | 19.4 | too high | 22 | 3.9 | |
| C.O.R¹ | 0.777 | 0.780 | 0.782 | 0.744 | 0.760 | 0.766 | 0.684 | 0.694 |
| Compression¹ | 164 | 166 | 168 | 158 | 161 | 158 | 153 | 156 |
| Shore D Hardness¹ | 67.3 | 67.6 | 68.1 | 65.5 | 66.4 | 64 | 65.3 | 66.5 |
| C.O.R² | 0.787 | 0.791 | 0.792 | | | | 0.697 | 0.715 |
| Compression² | 167 | 169 | 168 | | | | 157 | 160 |
| Shore D Hardness² | 67.2 | 69.5 | 68.8 | | | | 65.3 | 66 |

¹2 days aging
²2 weeks aging

Finally, comparison of Examples 14 and 15 with Comparative Example 1 show that addition of 12-aminoundecanoic acid to a medium acid ionomer also results in a large increase in C.O.R. and flexural modulus, again with an unexpected increases in processability as shown by the increase in MFI.

These result contrasts to trends observed for simple ionomers in which increases in C.O.R. are typically produced by increasing the acid content and/or degree of neutralization of the ionomer, both of which tend to reduce the processability of the resin as shown by an decrease in MFI.

I claim:
1. A blend composition comprising the reaction product of:
(A) a polymer comprising
  i. ethylene and/or an alpha olefin; and
  ii. one or more α, β-ethylenically unsaturated $C_3$-$C_{20}$ carboxylic acids, sulfonic acids or phosphoric acids;
  wherein the polymer comprising an unsaturated $C_3$-$C_{20}$ carboxylic acid comprises a high molecular weight component having a weight average molecule weight, Mw, from about 80,000 to about 500,000;
(B) a compound present in an amount from about 0.1 to about 40 phr; and-having a general formula $(R_2N)$—$R'$—$(X(O)_nOR_y)_m$, wherein
  i. R is selected from the group consisting of
    (1) hydrogen,
    (2) one or more $C_1$-$C_{20}$ aliphatic systems,
    (3) one or more cycloaliphatic systems,
    (4) one or more aromatic systems, and
    (5) combinations thereof;
  ii R' is a bridging group comprising
    (1) one or more unsubstituted $C_1$-$C_{20}$ straight chain or branched aliphatic or alicyclic groups, or
    (2) one or more substituted straight chain or branched aliphatic or alicyclic groups, or
    (3) one or more aromatic groups, or
    (4) one or more oligomers, each containing up to 12 repeating units, and
    iii. when X=C or S, m is 1-3,
    iv. when X=C, n=1 and y=1,
    v. when X=S, n=2 and y=1, and
(C) basic metal ion salt, which has the capacity to neutralize some or all of the acidic group present in Blend Components (A) and (B).
2. The blend composition of claim 1, wherein:
a. said Component (A) is an ethylene α, β-ethylenically unsaturated $C_3$-$C_{20}$ carboxylic acid copolymer or an ethylene/α, β-ethylenically unsaturated $C_3$-$C_{20}$ carboxylic acid/α, β-ethylenically unsaturated $C_3$-$C_{20}$ carboxylic acid ester terpolymer;
b. said Component (C) is a basic metal ion salt having a cation selected from the group consisting of, $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$.
3. The blend composition of claim 1, wherein:
a. said Component (A) is:
  i. a unimodal ethylene/(meth)acrylic acid copolymer or ethylene/(meth)acrylic acid/(meth)acrylate terpolymer; or
  ii. a bimodal polymer blend composition comprising:
    (1) a high molecular weight component having a weight average molecular weight, Mw, of about 80,000 to about 500,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, potassium, zinc, calcium, magnesium, and combinations thereof; and
    (2) a low molecular weight component having a weight average molecular weight, Mw, of from about 2,000 to about 30,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; said low molecular weight compo- nent being partially neutralized with metal ions selected from the group consisting of lithium, sodium, potassium, zinc, calcium, magnesium, and combinations thereof; and b. said Component (B) is present in an amount from about 1 to about 20 phr, and is selected from the group consisting of amino acids, carbamic acid, oxamic acid, anthranillic acids, and combinations thereof; and c. said Component (C) is a basic metal ion salt having a cation selected from the group consisting of, $Li^+$, $Na^+$, $K^+$, $Ca^{2+}$, $Zn^{2+}$, and $Mg^{2+}$, and combinations thereof.

4. The blend composition of claim 3, wherein:

a. said Component (A) is a unimodal ethylene/(meth) acrylic acid copolymer or ethylene/(meth)acrylic acid/(meth)acrylate terpolymer;

b. said Component (B) is present in an amount from about 1 to about 15 phr, and is selected from the group consisting of 4,4'-methylene-bis-(cyclohexylamine)carbamate, 11-aminoundecanoicacid, 12-aminododecanoic acid, and combinations thereof; and c. said Component (C) is selected from the group consisting of metal formates, metal acetates, metal nitrates, metal carbonates, metal bicarbonates, metal oxides, metal hydroxides, metal alkoxides, and combinations thereof.

5. An item of sports equipment comprising the blend composition of claim 1.

* * * * *